(12) United States Patent
Holschneider et al.

(10) Patent No.: US 7,483,812 B2
(45) Date of Patent: Jan. 27, 2009

(54) METHOD FOR DETERMINING A LINEAR RELATIONSHIP FROM MEASURED DATA THAT CAN BE STORED ELECTRONICALLY

(75) Inventors: Matthias Holschneider, Berlin (DE); Frank Kose, Berlin (DE)

(73) Assignee: Universitat Potsdam, Potsdam (DE)

( * ) Notice: Subject to any disclaimer, the term of this patent is extended or adjusted under 35 U.S.C. 154(b) by 397 days.

(21) Appl. No.: 11/182,723

(22) Filed: Jul. 15, 2005

(65) Prior Publication Data
US 2006/0015307 A1    Jan. 19, 2006

(30) Foreign Application Priority Data
Jul. 16, 2004   (DE) ................. 10 2004 034 398

(51) Int. Cl.
*G06F 17/18*   (2006.01)
*G06F 19/00*   (2006.01)

(52) U.S. Cl. ................. 702/181; 702/179; 702/182

(58) Field of Classification Search ................. 702/182, 702/179, 181
See application file for complete search history.

(56) References Cited

U.S. PATENT DOCUMENTS 6,442,487 B2 *   8/2002   Kim ................. 702/6
7,039,621 B2 *   5/2006   Agrafiotis et al. ............. 706/20
2002/0038196 A1 *   3/2002   Johnson et al. ............. 702/179
2005/0049826 A1 *   3/2005   Zhang ................. 702/179

OTHER PUBLICATIONS

Fiehn, Oliver, Metabolic Networks of Cucurbita Maxima Phloem, Phytochemistry 62 (2003), pp. 875-886.

* cited by examiner

*Primary Examiner*—Eliseo Ramos Feliciano
*Assistant Examiner*—Janet L Suglo
(74) *Attorney, Agent, or Firm*—Sutherland, Asbill & Brennan, LLP

(57) ABSTRACT

A method for determining a linear relationship in a set of measured data is provided. A set of measured values for at least two measured variables from the set of measured data is selected, and a respective measurement uncertainty interval is assigned to each of the selected set of measured values. A set of hypothetical linear relationships is formed based at least in part on the selected set of measured values. Partial probabilities for the set of hypothetical linear relationships are determined and assigned to the set of hypothetical linear relationships. A total probability is determined for at least a portion of the hypothetical linear relationships by summing the partial probabilities associated with the portion of the hypothetical linear relationships, and a rank of the set of hypothetical linear relationships is determined as a function of the total probabilities determined for the portion of the set of hypothetical linear relationships.

7 Claims, 18 Drawing Sheets

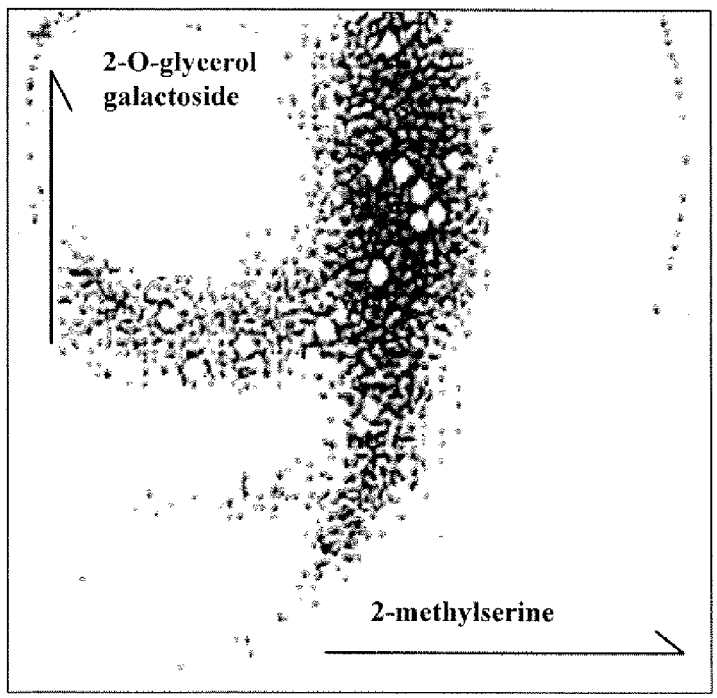
Fig. 13A
Fig. 13B
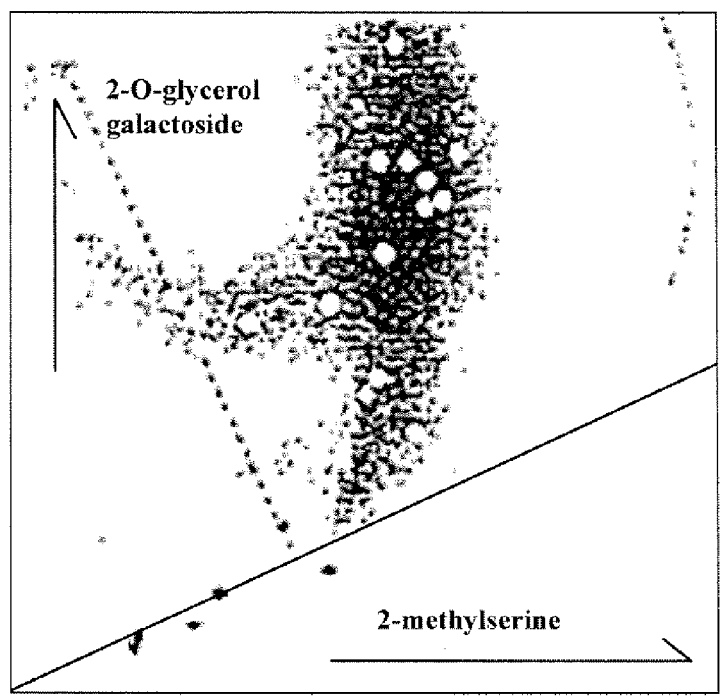

METHOD FOR DETERMINING A LINEAR RELATIONSHIP FROM MEASURED DATA THAT CAN BE STORED ELECTRONICALLY

The invention relates to a method for determining a linear relationship in a set of measured data that can be stored electronically, it being possible for the linear relationship to be represented graphically by means of a straight line.

PRIOR ART

A data set having measured data can be subdivided as desired with regard to its measured variables and the measured values to be assigned to the measured data, which is important inasmuch as the subdivision can assume a functional character. The simplest subdivision is the entire data set.

In statistics, measured data that is registered, which can be assembled as measured data to form a data set, is often described by means of the variables mean and variance. Linear relationships between individual measured variables, such as size and length of a stem diameter, are estimated by means of the methods of linear regression and/or correlation analysis. In the first case, it is already assumed that there is a linear relationship. In the second case, the relationship between the conditional and the entire variance between two measured variables is determined. The conditional variance is the proportion of the total variance between two measured variables which can be described by a linear relationship.

However, all these known evaluation methods assume that there is a true value which describes the measured variables and their relationships and which, although distorted by other influences, can be determined. For example, the mean is the value which probably comes closest to the true value of a measured variable. The deviation of the measured values from the mean is subtotalled in the variance and corresponds to the sum of all the influences which can distort this value. These influences are by definition not correlated and, in addition, there is no influence which is dominant. Thus, all the measured values of a measured variable are explained as the result of the sum of a true value and influences that distort it. However, in order to be able to assess these variables functionally, the data set is chosen such that it agrees with a specific function or property.

If, for example, the growth of a fungal culture at various temperatures is to be determined, then only the measured values which are assigned to the same temperatures are combined. The assignment of the measured values to the data set is therefore carried out on the basis of an already abstracted hypothetical functional relationship. In this trial approach, therefore, it is assumed, in a simplified manner, that the growth is a function of the temperature and, above all, that only one value of the growth corresponds to each temperature.

THE INVENTION

The object of the invention is to provide an improved method for determining a linear relationship from electronic measured data in which the limiting assumptions in the prior art are avoided.

This object is achieved by a method according to the independent claim 1.

With the aid of the method, unbiased (hypothetical) linear relationships can be determined as an expression of a functional relationship in sets of measured data. The method uses the analytical error as input, which means that random variance representing the measurement process is taken into account. This leads firstly to the situation where hypothetical linear relationships can always be brought into a connection with an exactly defined set of measured data. As a criterion for building the connection, a defined error interval may be chosen, for example if a distance of a measurement value from a hypothetical linearity falls below a particular value. Secondly, ruling out possible hypotheses because of an excessively high analytical error is prevented. This also makes it possible to rule out the uncertainty which lies in unmeasured values for the generation of a hypothesis, because they can be described sufficiently by a high analytical unsharpness.

Advantageous refinements of the invention are the subject of dependent subclaims.

DRAWING

The invention will be explained in more detail in the following text by using exemplary embodiments and with reference to a drawing, in which:

FIGS. 13A-13F show an x, y plot according to FIG. 12, the FIGS. 13B-13F representing various linear hypotheses with associated measured values (black symbols);

EXEMPLARY EMBODIMENTS

Figure 1:
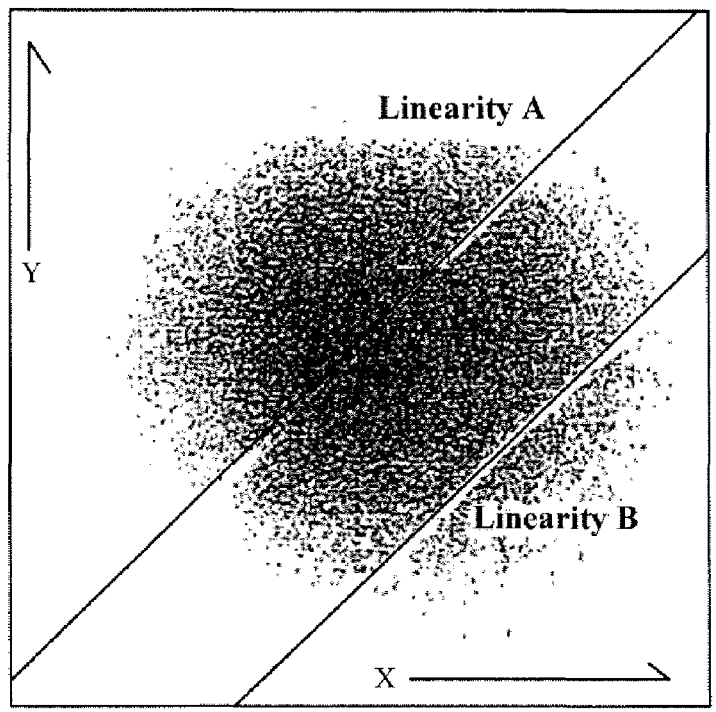
FIG. 1 shows an x, y plot having a central measured point (black dot) which is afflicted with measurement uncertainty.

The method described in the following text for evaluating measured data is unbiased with respect to known or assumed functional relationships. This means that the assignment of measured values to a data set is not carried out in accordance with known functional relationships but according to whether they could belong to their "behavior" corresponding to a functional relationship. In the case of the algorithm described here, this behavior is a linear behavior of two measured variables, (A) The Method for Determining a Linear Relationship First of all, the principles of the method will be explained as a sequence of steps.

Step 1

In a first step, an arbitrary pair of two measured variables is chosen and a search is made for one or more groups of measured values which could be explained by a linear behavior.

The basic assumption for finding linear relationships is the knowledge of the measurement uncertainty of the measured variables. Measurement uncertainty includes the knowledge about measuring errors which occurr during every measurement. These are estimated from the knowledge of the measuring procedure. For example, with the aid of a rule it is only possible to resolve sizes in the millimeter range. The variance which enters the data set via the measuring process is not linked functionally with the measured variable determined and is described as a Gaussian standard function. In the preferred exemplary embodiment, the describing measure used is the interval +/− 2 times the standard deviation, which contains the true value of the measured value with 95% certainty. This information is fundamental, since different measurement errors can blur the search for a linear relationship to different extents.

Step 2

In a second step, therefore, for each measured value the measurement uncertainty is estimated and this is specified in the interval +/− 2 times the standard deviation ($\sigma$). The step which then follows is linked with BAYES' law $$p(A \mid B) = \frac{p(B \mid A) p(A)}{p(B)}. \quad (1)$$

B stands for measured variable and A stands for model which, in the present case, is equivalent to a linear behavior. p(A/B) is designated the likelihood and indicates the probability of the model A under the condition of the measured values B. This is equal to the probability of the measured values B, if A fits, weighted with the ratio of the probabilities of the model A and of the data B. In an example, assume that B is the moisture at a location X. If it has rained, this location is wet with a specific probability, but there can also be other reasons. The rain is an explanatory model, in this case A. Thus, p(B/A) is the probability with which location X is wet when it has rained. One can now calculate the probability p(A/B). This means that the knowledge as to whether the location X is wet can be used to calculate the probability that it has rained. To this end, p(B/A) is multiplied by p(A), that is to say with the probability that it is raining, and divided by the probability p(B) that it is wet. If p(A) and p(B) are equal, this means that p(A/B) and p(B/A) are equal. It is therefore possible to use the moisture to derive whether it has rained equally well as to use the knowledge about the rain to derive the fact that the location X is wet.

This principle is transferable. In the case of the method described here, A stands for the probability or the model whose probability is to be estimated. This is the linear relation between two measured variables. The data B is measured variables. From the knowledge of the probability of the measured values at their measured locations, it is therefore possible for the probability of a specific linear relationship to be derived in exactly the same way as the probability of measured values if a specific linear relationship is assumed. Accordingly, the probability p(B/A) is the description of the true place of residence of the measured value, the Gaussian function which describes the unsharpness of the measurement. p(A) is the probability of the model, and p(B) is the probability of the measured data. Since there is no model which, so to speak, has a higher probability, p(A) is the same for all models. The same applies to the measured values. The ratio of p(A) and p(B) is therefore constant. Since, during the search for the most probable linear relationship, it does not matter how high the probability is but whether the assumed liner relationship is the most probable, this factor can be disregarded. The result is therefore:

$$p(A \mid B) = k p(B \mid A) \quad (2)$$

This formula can be executed for each measured value. This means that each measured value weights all the linear hypotheses independently. If two points lie at different distances from an assumed linearity, then the latter is probable to a different extent in view of these points. In order to combine the set of all measured values during the assessment of a hypothesis, the product of the calculated probabilities of each measured value is formed. It is therefore:

$$p\left(A \mid \sum B\right) = k \cdot \prod_n p(B_i \mid A) \quad (3)$$

Formula (3) can also be used as the sum of the logarithms and is then:

$$p\left(A \mid \sum B\right) = k \cdot \sum \log(p) B_i(A)) \quad (3a)$$

(3) and (3a) can be used with equal rights in the method. In all the following evaluations, formula (3a) will be used as a simplification.

The central point is, as results above, the term p(B/A), which is described by the Gaussian function and which represents the analytical error of a measured value. For the purpose of clarification it is useful to imagine p(B/A) as a third dimension. In a two-dimensional plot, this Gaussian function assumes the form of a hill, the peak lying vertically above the measured value (cf. FIG. 1). This means, as a result, that the true measured value in two-dimensional space is located somewhere "under" this hill. The smaller the height, the less probably is the true measured value located at this point.

Different true measured values explain different linear relationships. On the other hand, Different possible measured points can lie on a line and thus explain one and the same linear relationship. The solution results from the fact that a start is made from the idea that each hypothetical model A can cut a "hill", as though this hill were cut at the cut edge. At the "cut edge", an area having the form of a Gaussian distribution becomes visible. This area is the probability of the value B if the model A fits. This area varies, depending on where a line cuts the "hill" (cf. FIG. 1). Thus, different linear relationships have different probabilities on the basis of our measured point.

The integral is calculated by means of the following formula:

$$p(B_i/A) = e^{\left(\frac{-x_i^2}{2\sigma_{xi}^2} - \frac{(y_i - P2)^2}{2\sigma_{yi}^2} + \frac{\left(\frac{x_i}{2\sigma_{xi}^2} + \frac{(y_i - P2)P1}{2\sigma_{yi}^2}\right)^2}{\frac{1}{2\sigma_{xi}^2} + \frac{P1^2}{2\sigma_{yi}^2}}\right)} \quad (4)$$

i is the index of the respective measured value. This means that $p(B_i/A)$ is calculated for each pair of measured values $x_i$ and $y_i$ of the selected measured variables. $\sigma_{xi}$ and $\sigma_{yi}$ are the standard deviations associated with $x_i$ and $y_i$ of the ith pair of measured values and describe the measurement error for these measured values. $\sigma_{xi}$ and $\sigma_{yi}$ are calculated from the information in the second step by halving. P1 and P2 represent the parameters of a general straight-line equation.

$$y = P1 \cdot x + P2 \quad (4a)$$

P1 is generally designated the slope, P2 the point of intersection with the y axis.

In addition, a summand 1 is introduced, so that the following formula results from formula (4).

$$p(B_i/A) = e^{\left(\frac{-x_i^2}{2\sigma_{xi}^2} - \frac{(y_i - P2)^2}{2\sigma_{yi}^2} + \frac{\left(\frac{x_i}{2\sigma_{xi}^2} + \frac{(y_i - P2)P1}{2\sigma_{yi}^2}\right)^2}{\frac{1}{2\sigma_{xi}^2} + \frac{P1^2}{2\sigma_{yi}^2}}\right)} + 1 \quad (5)$$

This summand has the task of decoupling the influence of the measured values on the product in formula (3) from one another. It is clear that, for example, in the case of an outlier, $p(B_i/A)$ can virtually approach 0. The product in formula (3) would correspondingly likewise be very small and would approach 0. This means that all the measured values would more or less have to explain the hypothetical line, in order that this case does not occur. Since it was assumed that outliers exist and, above all, that a plurality of linear relationships can exist simultaneously, this circumstance must be masked out. This is ensured by the introduction of a constant 1. As a result, one is now able to calculate a likelihood in relation to each hypothetical linear relationship, defined by P1 and P2. It should be added once more that, in all the further steps, the sum of the logarithms is used, even if the formulas (3) and (3a) can be used with equal rights.

With the formulas introduced, the possibility is now created of calculating the likelihood or probability for any desired hypothesis. However, how many hypotheses now exist—actually infinitely many. Therefore, it is as good as impossible to find the most probable hypothesis or hypotheses by means of simple trial and error, particularly since it is not known with which subset of the measured values these is (are) linked. This certainly has to be discovered at first. However, a trial and error rate can easily be estimated. Here, a specific application of the Hessian standard form helps, which is used at the same time for compact visualization. For the two-dimensional case, the Hessian standard form is:

$$ax + by \quad (6)$$

where a, b and c are arbitrary constants. x and y are the measured variables. The straight-line equation (see formula (4a)) can also be derived from this form, and is then:

$$y = -\frac{a}{b}x + \frac{c}{b} \quad (7)$$

$$-\frac{a}{b} = P1 \quad (7a)$$

$$\frac{c}{b} = P2 \quad (7b)$$

Figure 2:
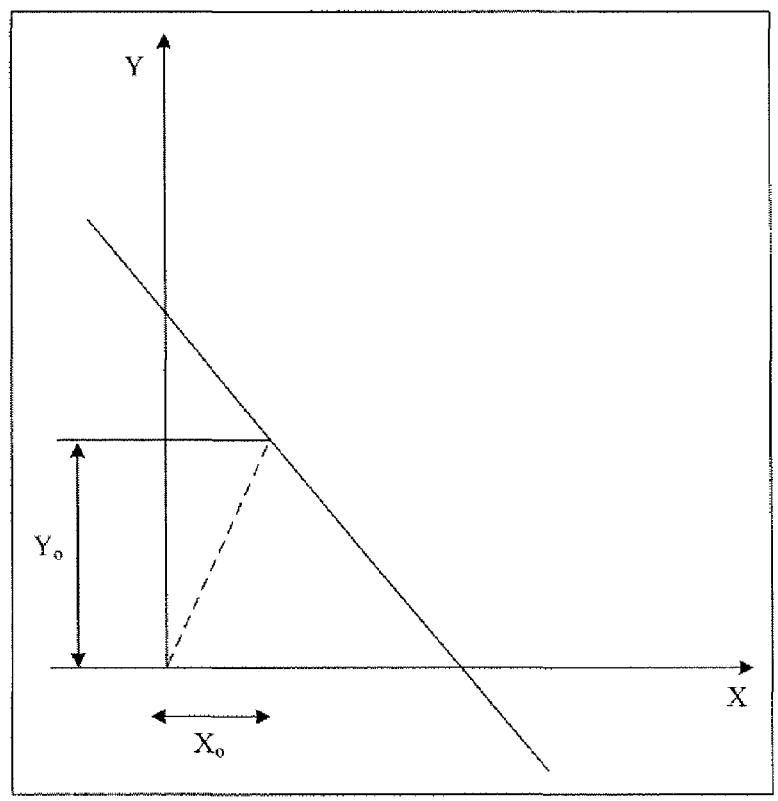
FIG. 2 shows an x, y plot having a hypothetical linear relationship, which is symbolized by means of a continuous line with a negative slope.

FIG. 2 illustrates this fact. FIG. 2 shows a two-dimensional graph with the two axes x and y. The continuous line symbolizes the linear relationship. The dashed line is the normal to this line which, at the same time, goes through the origin. $x_n$ and $y_n$ are the coordinates of the point at which the normal meets the dashed straight line. It is true that:

$$\frac{x_n}{y_n} = \frac{b}{a} \quad (8)$$

P1 can therefore be calculated:

$$P1 = -\frac{x_n}{y_n} \quad (8a)$$

The distance from the origin to the meeting point can be calculated by means of the following equation.

$$|\text{Normal}| = \sqrt{\frac{ac + bc}{a^2 + b^2}} \quad (9)$$

P2 can be derived from the previous formulas. The result for P2 is:

$$P2 = y_n + \frac{x_n^2}{y_n} \quad (9a)$$

The most important point, the estimation of the trial and error rate or the selection of the hypotheses which are to be incorporated in an assessment is now to be presented in the following text.

Figure 3A:
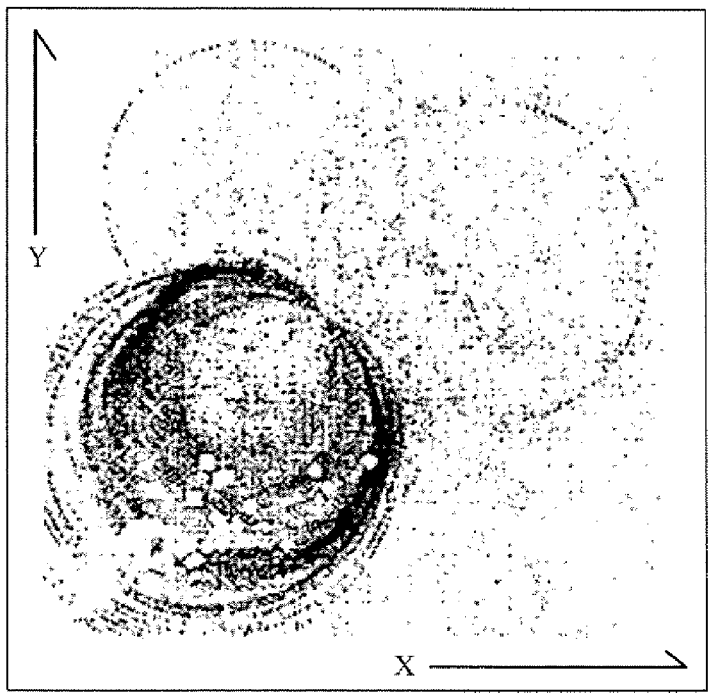
FIGS. 3A, 3B show an x, y plot having measured values of two measured variables from a data set, which was published in Fiehn, O.: Metabolic networks of Curcubita maxima phloem. Phytochemistry 62 (2003), 875-886, with a likelihood distribution illustrated in the background.
Figure 3B:
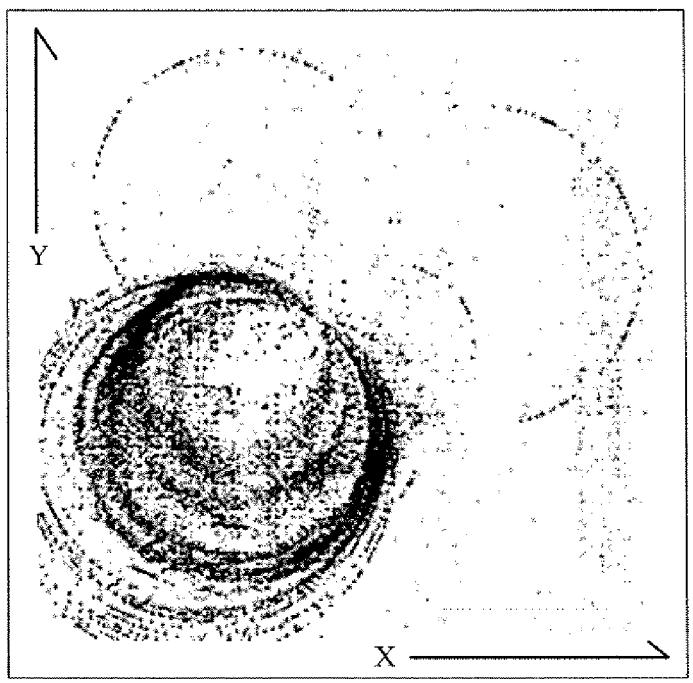

In order to illustrate the procedure, reference is made to FIG. 3. FIG. 3 shows an x, y plot in which measured values of two measured variables of a data set described are plotted (white symbols). The knowledge of the measured variables is unimportant. Plotted as a background to the symbols is a likelihood distribution which, for the purpose of illustration, is illustrated once more on the right in FIG. 3 without measured values. The likelihood increases from white to black.

Figure 4A:
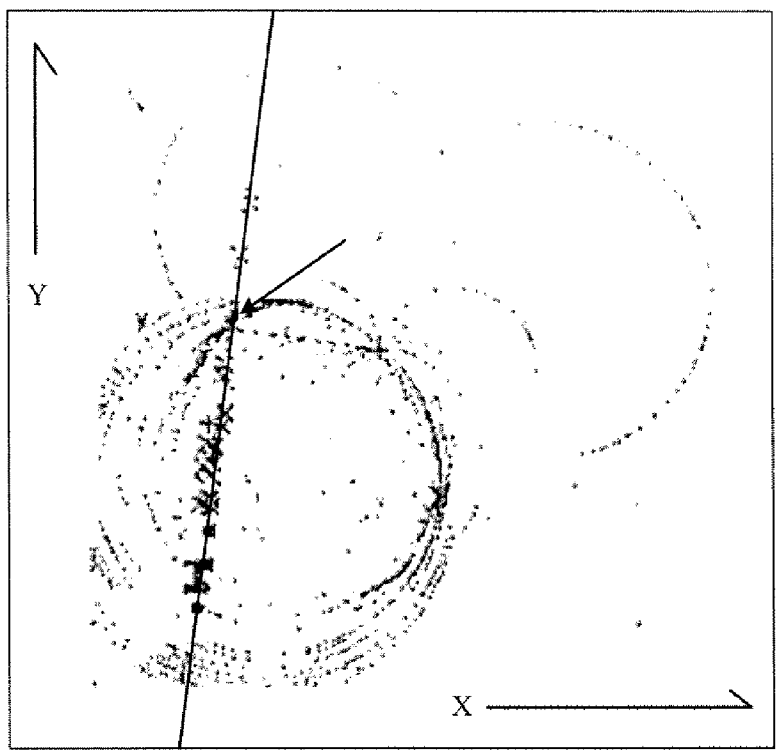
FIGS. 4A, 4B show an x, y plot as in FIG. 3 with a hypothetical linear relationship drawn in (continuous line), with a likelihood distribution illustrated in the background, with and without measured values.
Figure 4B:
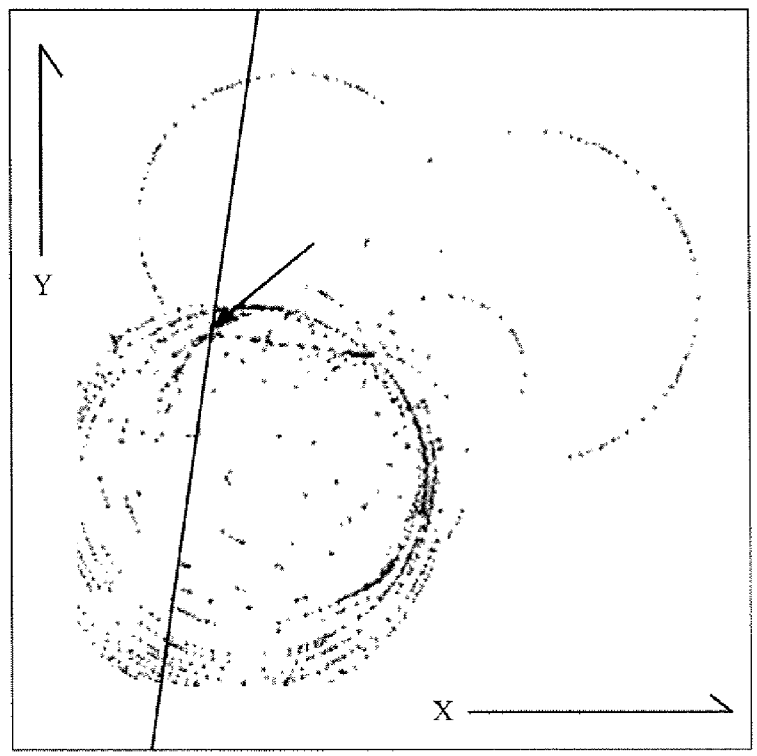

FIG. 4 shows the linking of coordinates of a point in the x, y plot with the parameters of a hypothetical linear relationship. The principle can be seen again from FIG. 2. The cross represents a coordinate origin. This can be selected as desired. The meeting point of the normal is identical with a local maximum in FIG. 4 and, at the same time, stands for a hypothetical linear relationship which is illustrated in the straight line. From the coordinates of the point (arrow), it is thus possible for the parameters of the linear relationship (formulas (8a) and (9a)) and also the likelihood to the estimated simultaneously. The advantage of the application of the Hessian standard form therefore consists in the fact that the set of all practical hypotheses can be derived from the scanning of a defined area. This area is defined by the maximum and minimum measured values of the two measured variables. The scanning rate or, better, the interval between individual scanning points should sensibly depend on the extent of the measurement uncertainties. A value of 1/10 of the smallest measurement uncertainty interval normally supplies sufficiently accurate scanning results.

Step 3

In a third step, the range of values of the selected measured variables is subdivided into intervals. Equidistant intervals are recommended. The range of values can be variable; however it should expediently reach at least from the smallest to the largest value of the measured variable. The length of an interval should not exceed the magnitude of the smallest measurement uncertainty interval in one of the two measured variables divided by two. The length of a magnitude of the smallest measurement uncertainty interval in one of the two measured variables divided by 10 is recommended. The combination of all the intervals from both measured variables yields the number of scans and is identical to the product of the numbers of intervals of the two measured variables. Furthermore, an arbitrary point is defined which is used as a coordinate origin for the application of the Hessian standard form and should expediently lie within the area which is defined by the maximum and minimum measured values of the two measured variables.

The further procedure is identical for each scanned point. From the relative position of the scanned point $(x_n, y_n)$ from the coordinate origin, the parameters P1 and P2 are calculated in accordance with the formulas (8a) and (9a). Then, one after another, all the measured values $x_i$, $y_i$ are inserted into formula 5 with the appropriate values $\sigma_{xi}$, $\sigma_{yi}$ and the resultant likelihood values are summed as logarithms in accordance with formula (3a) or multiplied as factors in formula (3). As a result, we obtain a total likelihood for a hypothetical linear relationship, which is calculated from the residence probabilities of the measured values. This total likelihood can be represented as a colored area corresponding to its value, the area being identical to the interval combination specified in step 3, within whose boundaries the scanned point lies. In this way, the graphics in FIGS. 3 and 4 are determined. The scanning rate was 250 scans in the x and y direction. The time for a calculation with a laptop, Pentium 4, 1.2 GHz, was about 20 seconds.

Step 4

In a fourth step, from each interval combination, a value for both measured variables is selected which lies within the interval or else on the boundary. First of all, by means of the Hessian standard form, the straight line parameters (formulas (8a) and (9a)) are derived. These are used in the formulas (3), (3a) and (5) to calculate the likelihood, as explained above. This value can be visualized graphically by the interval combination being represented as a colored area in a two-dimensional plane.

Step 5

A fifth step results from the fact that the scanning proposed is not sharp. If it becomes clear from the evaluation of the results that further information can be "hidden" in a region of the graphic, steps 2 to 4 are possible for every other arbitrary area interval.

In the fifth step, from the comparison of the likelihood values, interval combinations can be assessed against one another. Each interval combination can be processed further in accordance with steps 3, 4 and 5.

Figure 5:
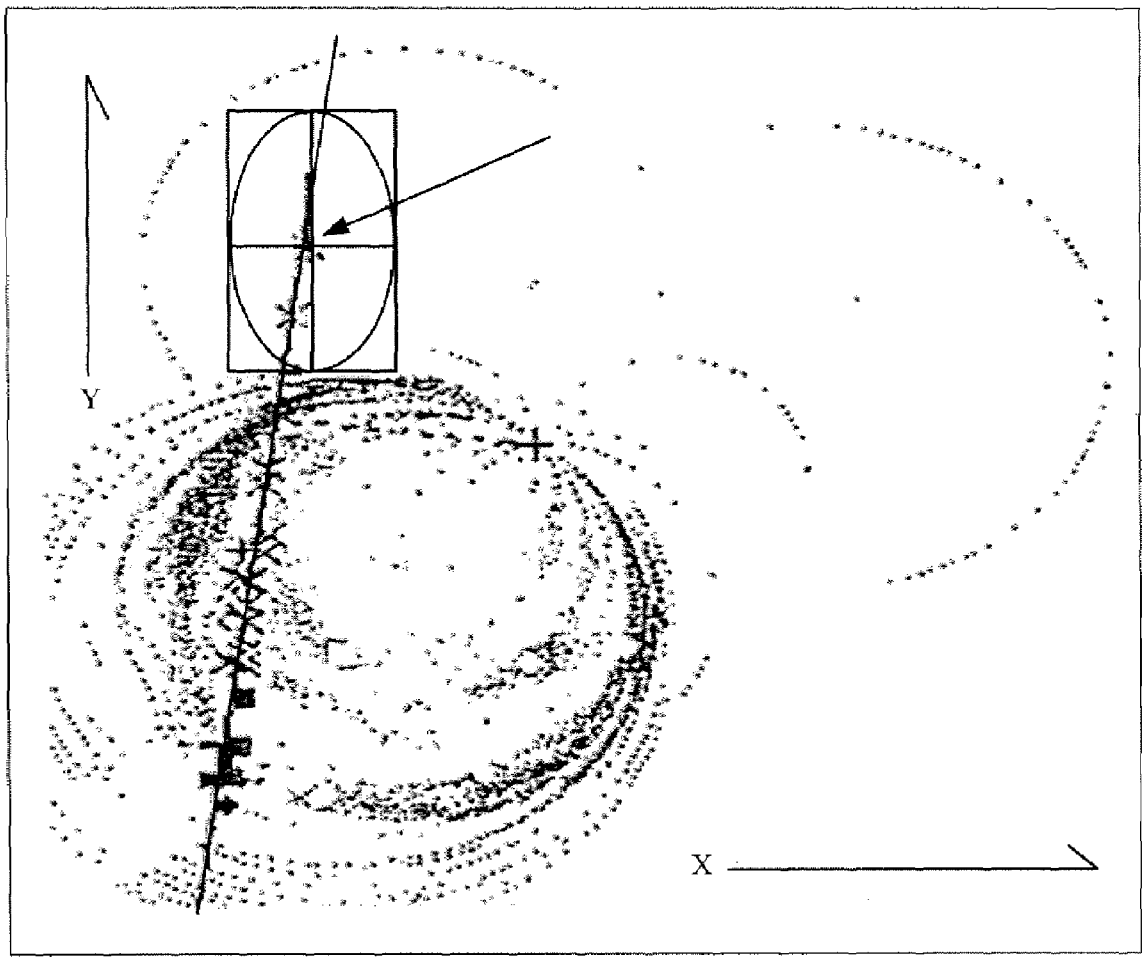
FIG. 5 shows an x, y plot as in FIG. 4, a measurement uncertainty interval being illustrated.

The assignment of the measured values to a linear relationship is carried out when the error interval or else the area in which the true measured value is to be assumed intersects this straight line. The error interval which applies is the error uncertainty chosen in the second step with +/− 2 times the standard deviation. The aforementioned facts are illustrated in FIG. 5. This is identical to FIG. 4, with the additional illustration of the measurement uncertainty interval of the measured value designated by the arrow. This measurement uncertainty interval can be used as a rectangle or ellipsoid, depending on the question posed. The rectangular form is used when the intention is to ensure that at least 95% of the measured values are to be assigned to a measured variable. The ellipsoidal form is chosen when 95% of all pairs of measured values are to be assigned to both measured variables. All the measured values which can be assigned to the hypothetical linearity represented have been illustrated as black symbols.

As illustrated, it is thus possible, from the use of the Hessian standard form, to derive all of the hypotheses which are needed for a good decision or selection of the most probable hypothesis.

Step 6

In a sixth step, on the basis of the calculated likelihood values, a linear relationship is chosen and is assigned all those measured values whose measurement uncertainty interval intersects the straight line which symbolizes this linear relationship. The measurement uncertainty interval comprises the interval of +/− 2 times the standard deviation illustrated in step 2, and can be used as an ellipsoid or rectangle.

The selected measured values represent a data subset for which, on the basis of the method described above for its determination, a functional relationship in the form of a linear relationship of at least two measured variables can be expected. The data subset can be investigated with other statistical methods, it having been shown that further (potent) pairs of measured variables can be explored. These can be processed with all the steps mentioned previously.

(B) EXAMPLE 1

In the following text, the application of the method to the determination of a linear relationship from electronic measured data, as has been explained above in detail, will be described for a simulated set of measured data, with reference to FIGS. 6 to 8.

Figure 6A:
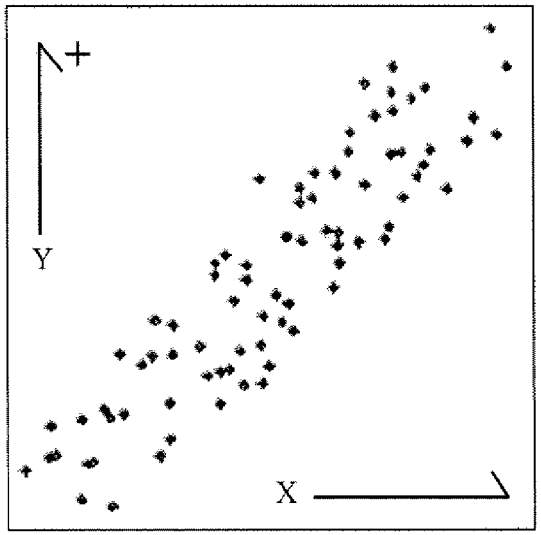
FIGS. 6A, 6B show an x, y plot of a set of simulated measured data for two variables x and y, linear relationships on which the simulation is based being drawn in FIG. 6b.
Figure 6B:
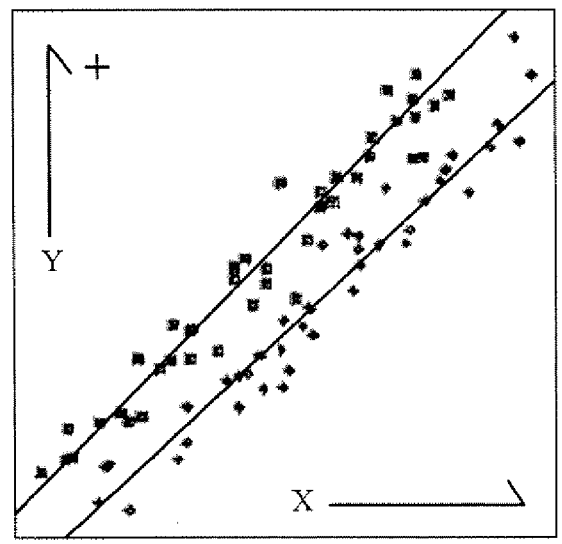

A simulated set of measured data comprising two variables x and y will be assumed. The simulation consists in all the points having been derived from two linear relationships. FIG. 6A, left, shows the set of simulated measured data without the basic relationships being visible. In FIG. 6B, right, the fundamental linear relationships are indicated as lines. At the same time, different symbols illustrate which point has been derived from which linear relationship.

Figure 7:
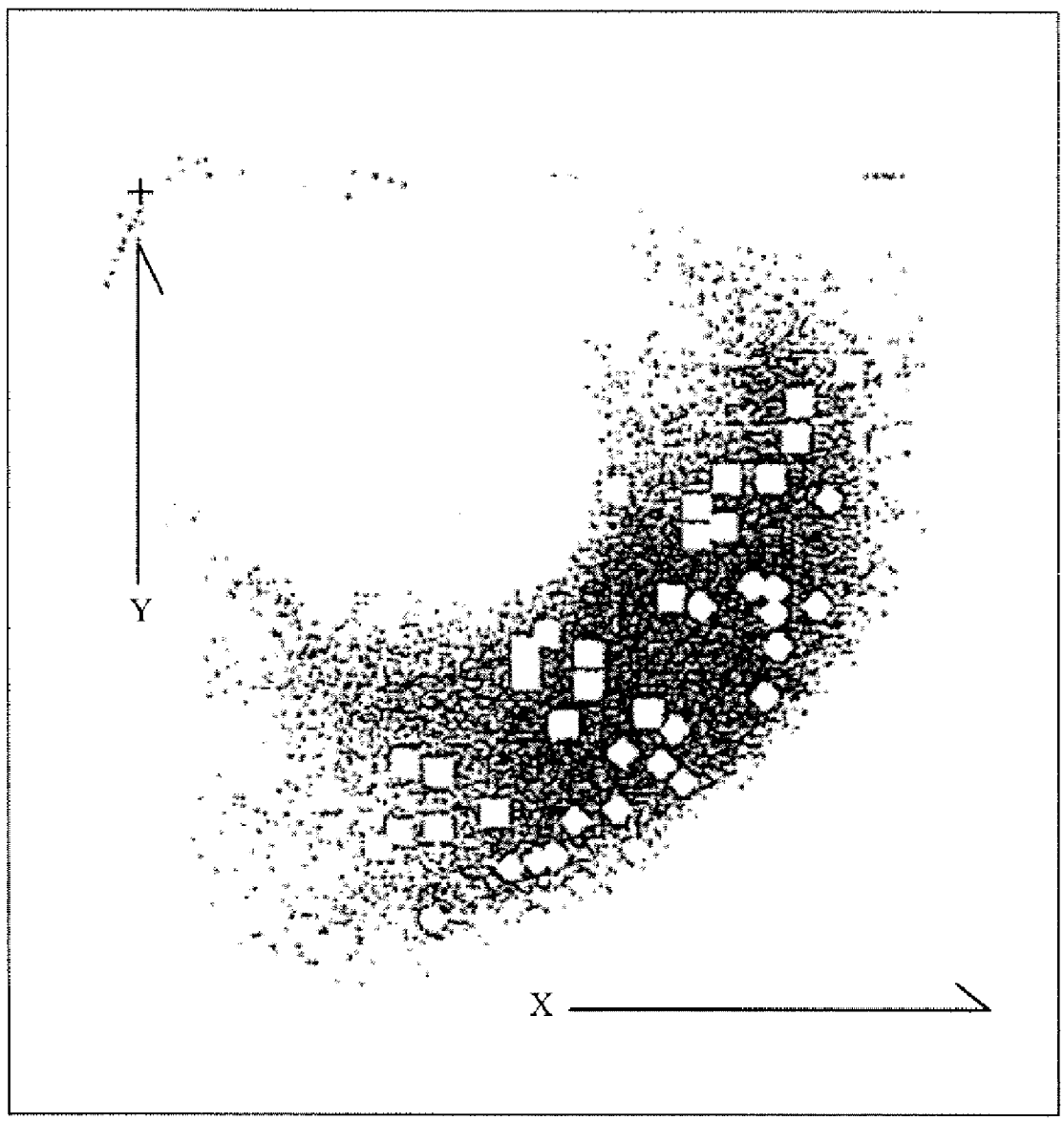
FIG. 7 shows an x, y plot as in FIG. 6b, measured values being illustrated as white symbols and a likelihood distribution additionally being illustrated in the background.

FIG. 7 shows the same plot, an associated likelihood distribution being illustrated in the background. The various gray values represent different values of the likelihood. These increase from white to black. The black points indicate local maxima. The cross at the top left edge is not fixed in terms of its position but is necessary in order, in accordance with the requirements described above, to achieve the unambiguous ability to assign coordinates in the plot to exactly one hypothetical linear relationship. Three maxima can substantially be seen, if those which are visible in the vicinity of the cross are disregarded. The scanning rate was 250 in both dimensions. This means that not necessarily all the local maxima are indicated. However, there is the possibility of looking for "regions" in which other linear relationships can be supposed.

Figure 8A:
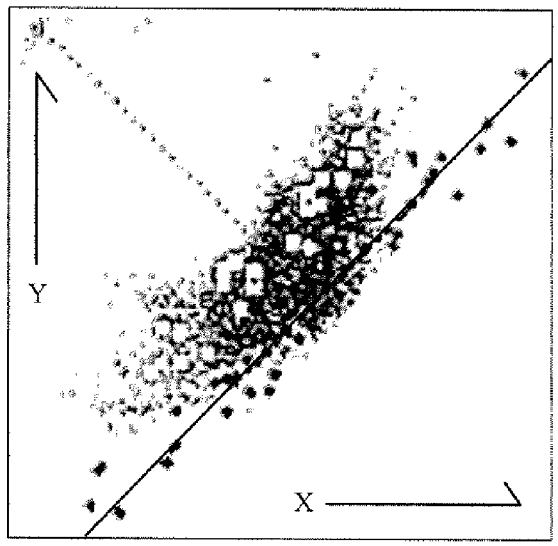
FIGS. 8A, 8B, 8C show an x, y plot as in FIG. 7 for three different hypothetical linear relationships and a likelihood distribution in each case illustrated in the background.
Figure 8B:
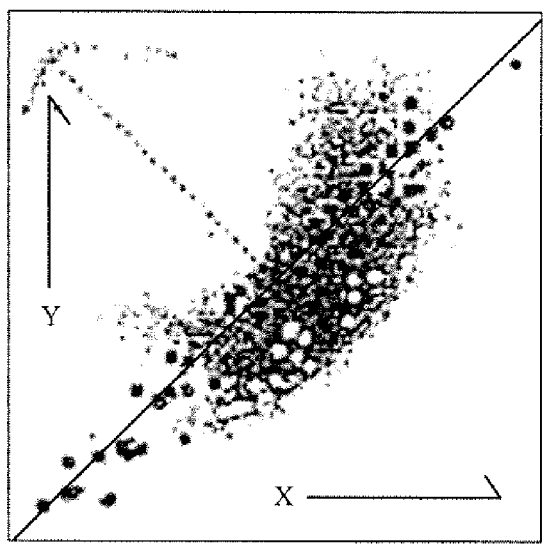
Figure 8C:
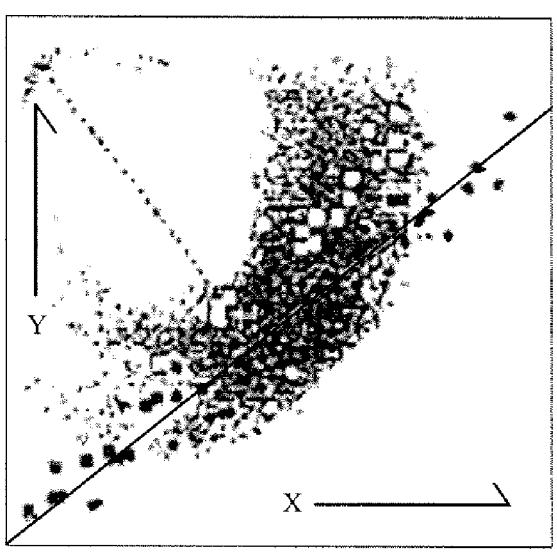
Figure 9A:
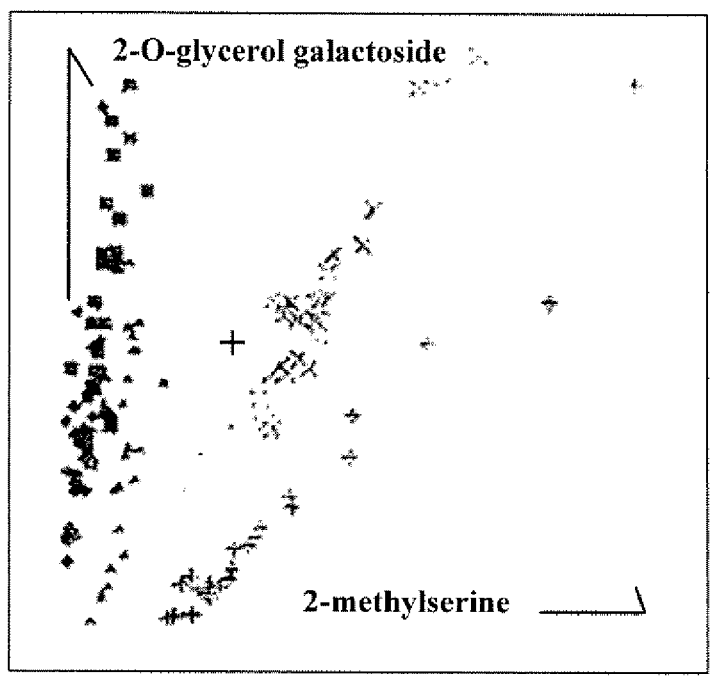
FIGS. 9A, 9B show an x, y plot of 2-methylserine (x axis) against 2-O-glycerol galactoside (y axis) from phloem data from pumpkin with associated likelihood distribution.
Figure 9B:
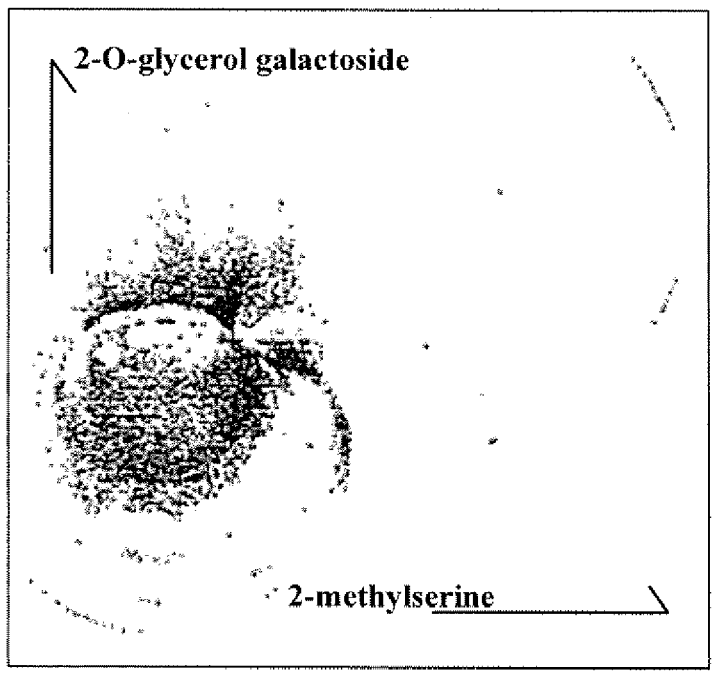

The hypothetical linear relationships corresponding to the aforementioned three maxima are illustrated in FIGS. 8A, 8B and 8C. It becomes evident that the linear relationships used in the simulation were able to be detected (FIGS. 5A and 8B). The assignment of the points to corresponding linear relationship was possible with an accuracy of 5% (circle ... 2 wrongly positive) to 25% (rectangle ... 8 wrongly positive and 2 wrongly negative). The third hypothetical linearity results from a superimposition of the two originals. This is not an erroneous interpretation but points to the fact that an object can be described or abstracted differently. Since the method described here "tackles the problem" in an unbiased manner, these relationships are also determined.

(C) EXAMPLE 2

In the following text, the application of the method to the determination of a linear relationship from electronic measured data, as has been explained above in detail, will now be described for a set of measured data for phloem samples from four different leaves and the fruit of a pumpkin, with reference to FIGS. 9 to 16.

The set of measured data was published in Fiehn, O.: Metabolic networks of Curcubita maxima phloem; Phytochemistry 62 (2003), 875-886. Over a time period of about 95 hours, about 24-27 phloem samples from four pumpkin plants each having two examined leaves and the fruit were taken and analyzed by means of GS/MS. The measured data used are normalized area values from the GC chromatogram.

First of all, an arbitrary pair of two measured variables is selected (step 1). The two measured variables mentioned in the following text are 2-methylserine (x axis) and 2-O-glycerol galactoside (y axis). The significance of the substances in the metabolism is unimportant for the description of the method according to the invention, since it primarily concerns the search for hypothetical linear relationships, this combination already appearing to be promising at first glance (cf. FIG. 9A). The various symbols symbolize the various organs of the plants, which means the four different leaves and those of the fruit. All the points from an organ form needle-like clusters, which could be described by linear relationships.

In the further course, the measurement uncertainty is estimated for each measured value, and this is specified in the interval with +/- 2 times the standard deviation (step 2). A relative error of 10% of the standard deviation was assumed as the measurement uncertainty. This value is incorporated in the calculation of the likelihood distribution, which can be seen on the right in FIG. 9B. The calculation of the likelihood distribution and the corresponding representation corresponds to the procedure in accordance with steps 3 and 4 described above.

Figure 10:
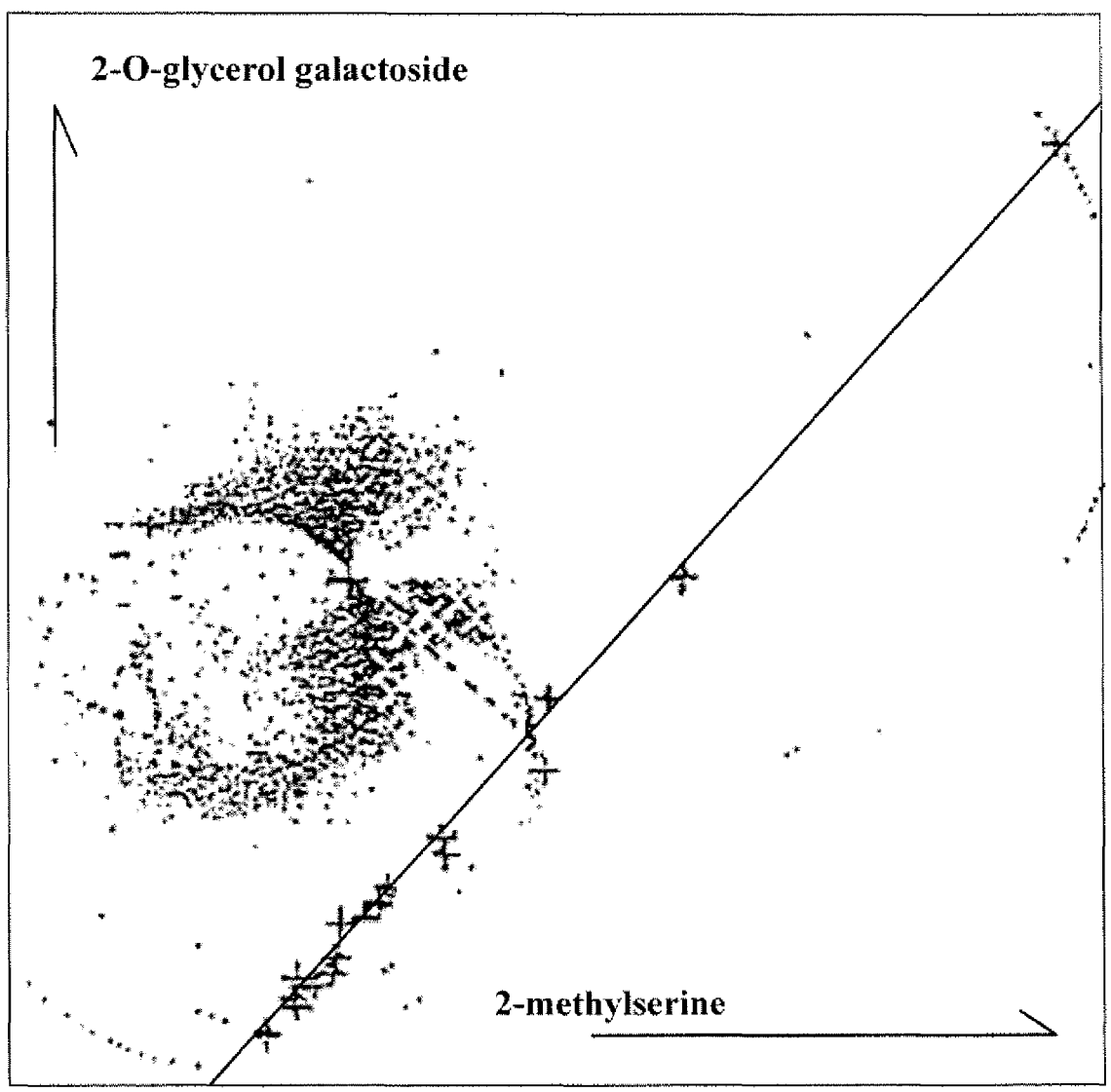
FIG. 10 shows an x, y plot as in FIG. 9, a local maximum being chosen by using the likelihood distribution and a corresponding linear relationship being illustrated.

The following step deals with the assessment (step 5). By using the gray values of the points in the likelihood distribution, the different hypotheses can be assessed. In FIG. 10, a local maximum has been selected and the corresponding hypothetical linearity has been illustrated. On the basis of the assumed measurement unsharpness, this linearity could be assigned points which belong exclusively to one organ. (+) stands for leaf no. 4 here. Of 25 points, 20 have been detected. This would correspond to an assignment accuracy of 20% if we knew already that all the points were to be assigned to a linear relationship. However, as opposed to the previous section, this knowledge is not yet available. It is not possible to deny that there is perhaps a plurality of linear relationships which, as described above, can result in a homogenous set of points.

Figure 11A:
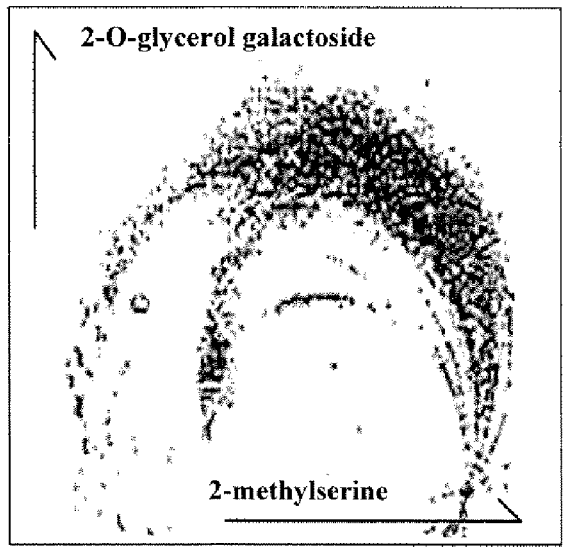
FIG. 11A shows an x, y plot according to FIG. 9, a changed coordinate origin having been chosen for the likelihood distribution.
Figure 11B:
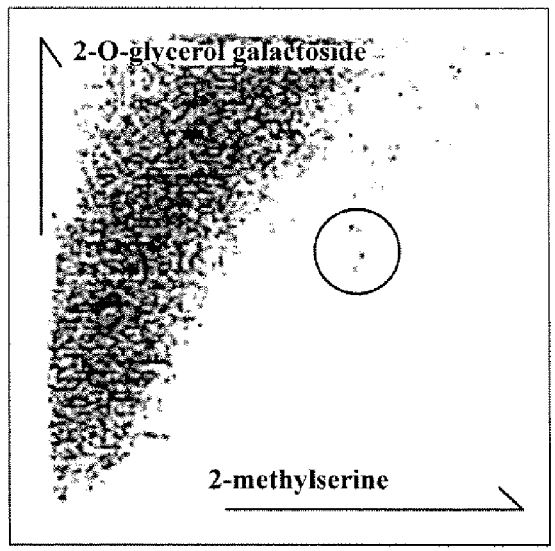
FIG. 11B shows an enlarged extract from FIG. 11A.
Figure 11C:
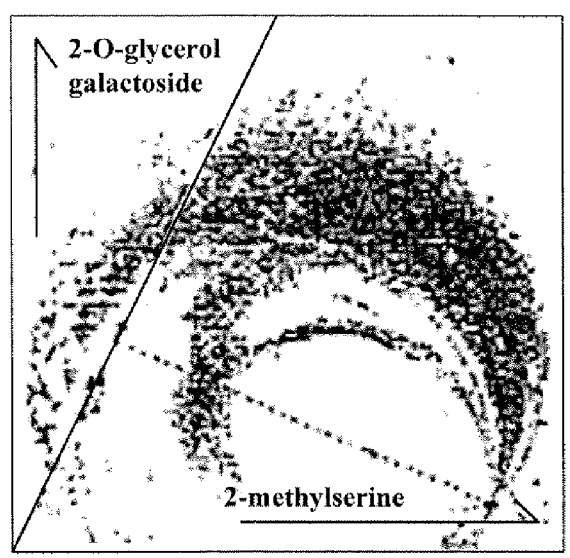
FIG. 11C shows an x, y plot according to FIG. 11A with a choice of a local maximum according to FIG. 11B and the illustration of a corresponding hypothetical linear relationship.

Two further aspects which are to be illustrated here are shown in FIGS. 11A, 11B and 11C. In FIG. 11A, the same x, y plot as in FIG. 10 is shown, but the likelihood distribution is different. This is the case since a different coordinate origin (cross) than in FIG. 10 has been used in FIGS. 11A-11C. However, since the principle of the Hessian standard form is maintained, the unambiguous assignment of the coordinates $x_n$ and $y_n$ (cf. FIG. 2) to a hypothesis is also maintained, even though the assignment has been changed. This procedure makes it possible to obtain different impressions and views by using different representations of the same information.

Secondly, different regions of the x, y plot are resolved differently as standard, which can be compensated for as a result, which is taken into account in step 3 described above.

Another aspect is what is known as zooming out. In FIG. 11A, a white square is shown which outlines a region of the illustration which has been illustrated enlarged in FIG. 11C. Within the square, a black circle is visible, which outlines two local maxima of the likelihood distribution. If a maximum is selected, the corresponding linear hypothesis is constructed and if the measured data which can be assigned to this linear relationship is assigned in accordance with step 6 described above, the result is FIG. 11C. All the associated measured values are shown in black and originate exclusively from one organ, the fruit. With this procedure, local maxima which could be overlooked on account of the limited resolution (interval size) are made deducible. Expediently, a coarse scan with relatively large scanning intervals can preselect regions which are then subjected to more accurate examination.

In the further course, all the measured values of the relationship already treated between 2-O-glycerol galactoside and 2-methylserin which originate from the organ comprising the fruit should be considered. These are illustrated as triangles in FIGS. 11A and 11C and as rectangles in FIG. 12. By using this data subset, the intention is to show that, with the aid of the description of hypothetical linear relationships, new relationships can be postulated.

Figure 12:
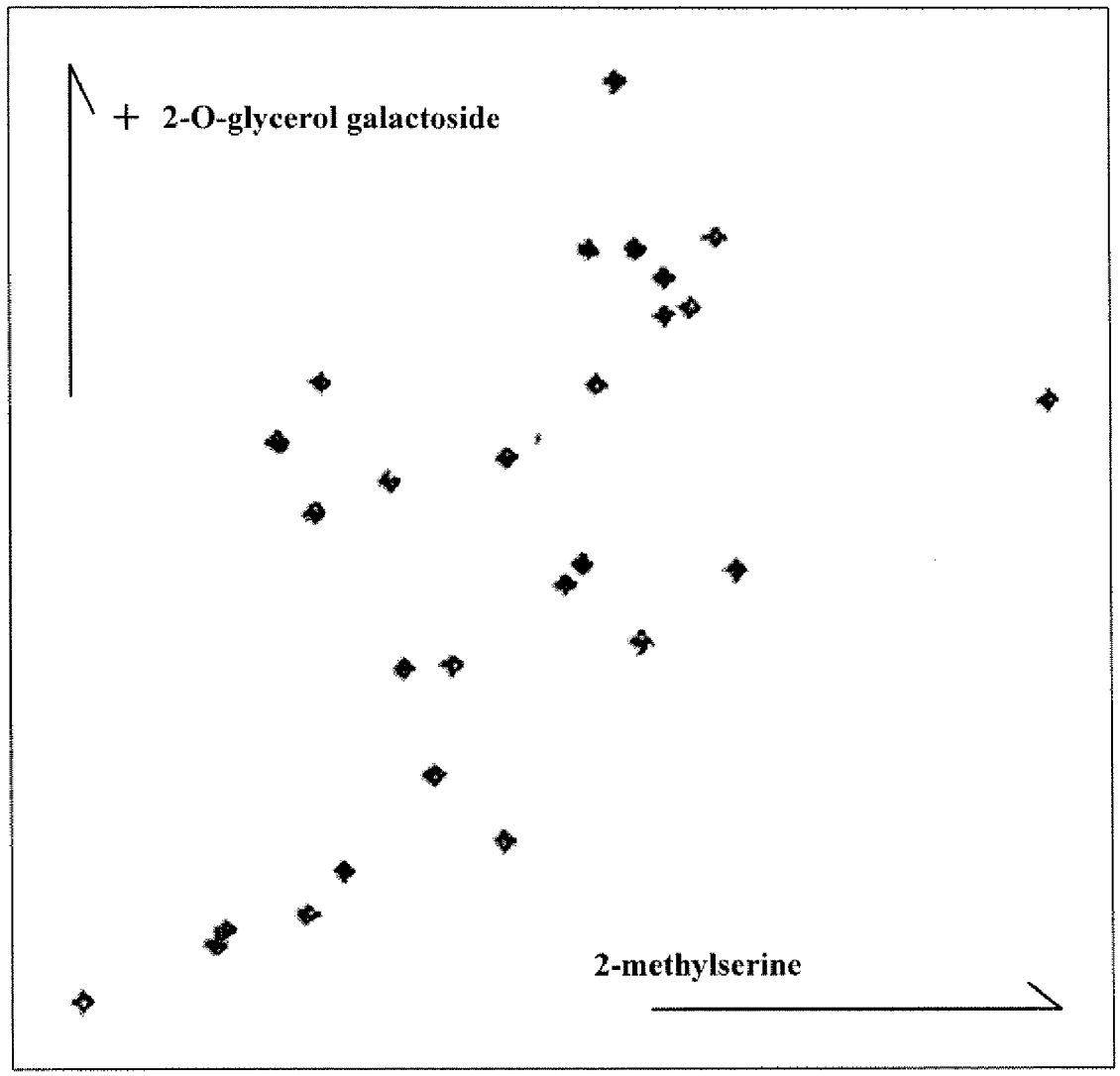
FIG. 12 shows an x, y plot with measured values of the fruiting body for the measured variables 2-methylserine and 2-O-glycerol galactoside.

In FIG. 13, the x, y plot already known from FIG. 12 with the likelihood distribution lying underneath is illustrated in various evaluation variants. In FIG. 13 (except FIG. 13A), hypothetical linear relationships are illustrated to which measured values (black symbols) are assigned at the same time. All the hypotheses (except FIG. 13B) have been derived from local maxima. The acceptance of this linear hypothesis can be founded on the fact that, with the hypothesis in FIG. 13D and in FIG. 13F, it explains all the associated measured values without overlap. There could therefore be three completely distinguishable linear regions. In addition, local maxima can be "blurred" as a result of the fact that they stand out as what are known as saddle points or "shoulders". The hypothesis in FIG. 13C can virtually be interpreted as a combined set of FIG. 13B and FIG. 13D.

Figure 13C:
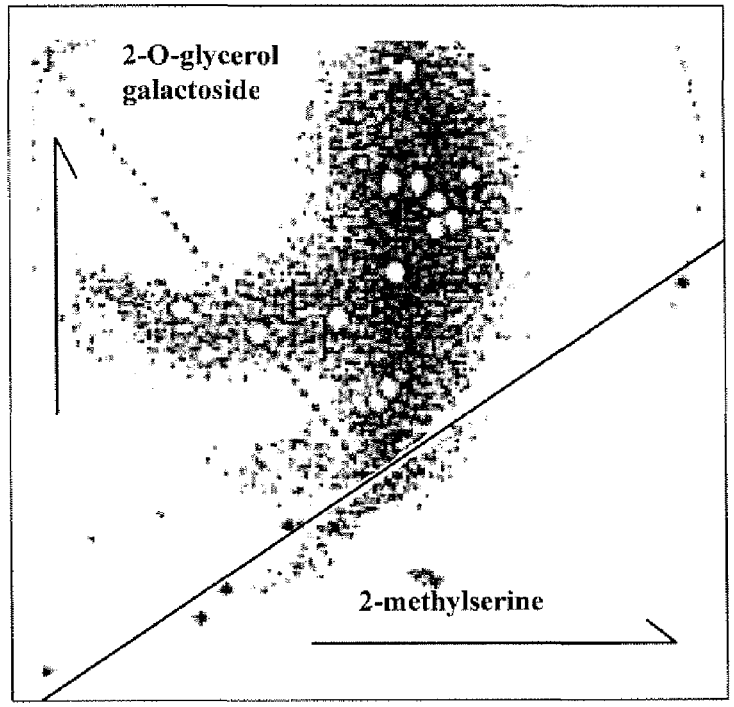
Figure 13D:
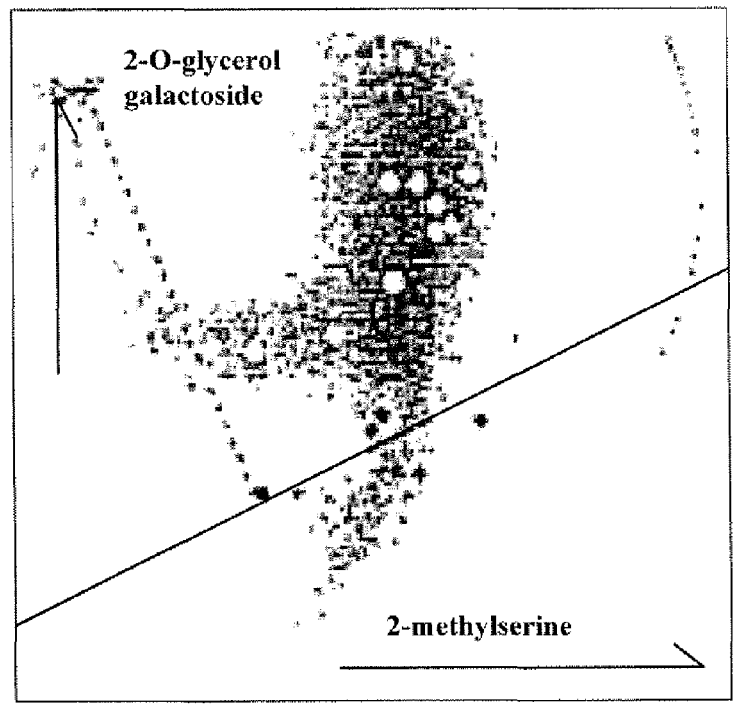
Figure 13E:
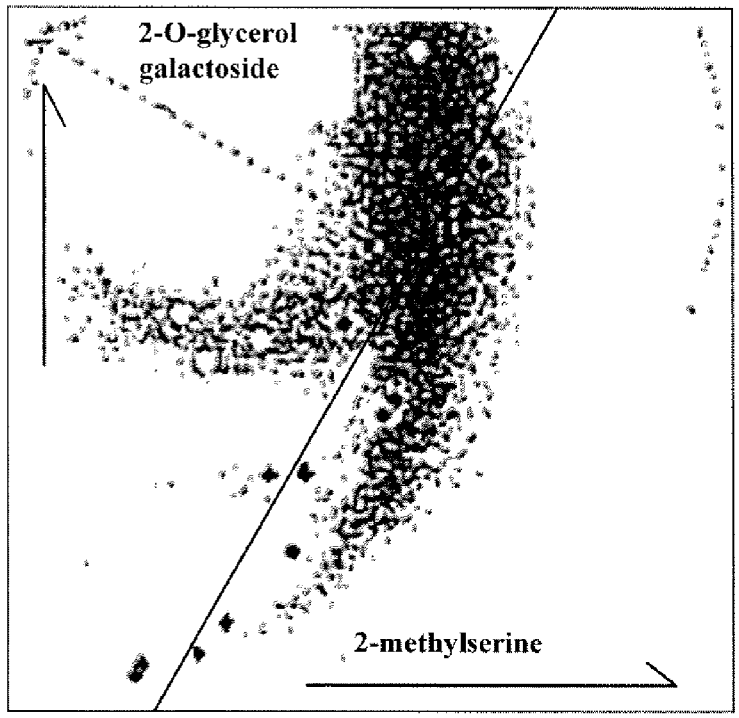
Figure 13F:
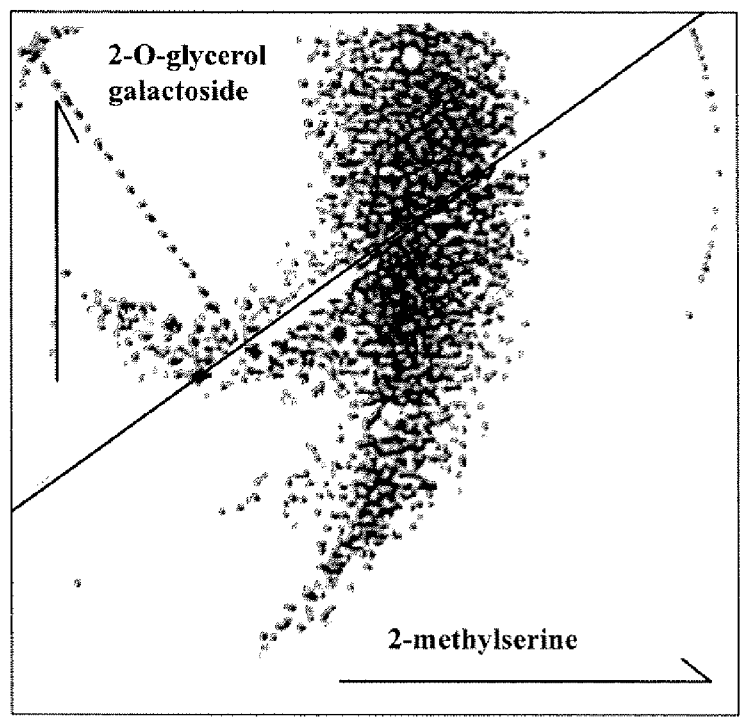
Figure 14A:
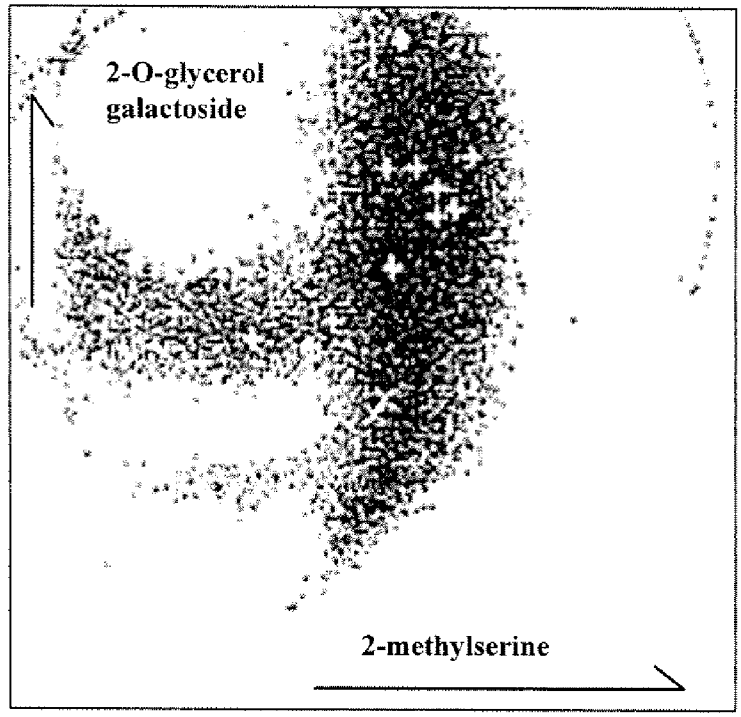
FIGS. 14A, 14B show an x, y plot according to FIG. 13 with clustering, various clusters being identified by means of various symbols.

The hypothesis in FIG. 13B recalls FIG. 8B. It overlaps various hypotheses. Various scenarios are therefore possible. In the following text, that one which results from FIGS. 13B, 13D and 13F is chosen. This grouping or clustering is illustrated in FIG. 14A. In this case, various clusters are identified by different symbols.

Figure 14B:
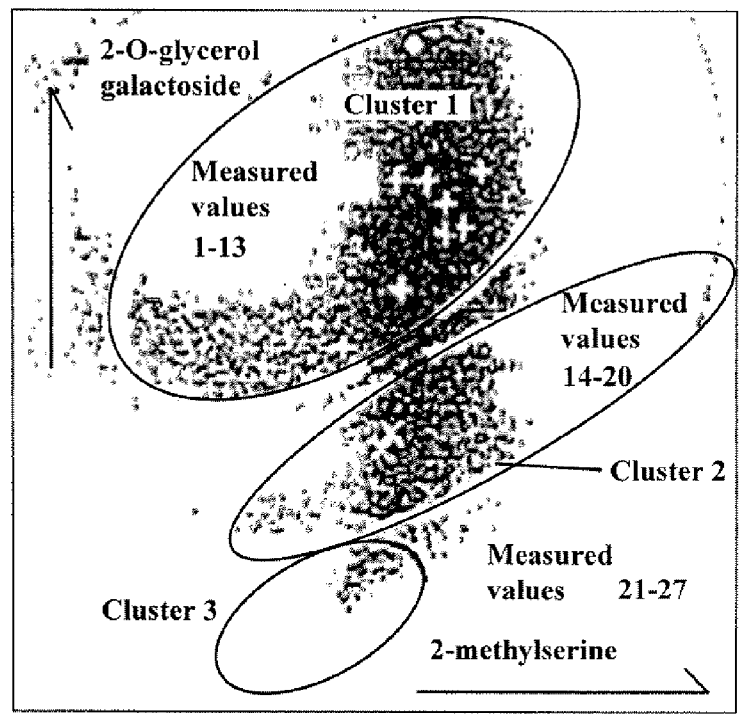

In FIG. 14B, the measured values are combined into progressively numbered blocks. The clusters 2 and 3 are homogenous with the clustering illustrated in FIG. 14A. Cluster 1 combines the remainder, there likewise being coincidence apart from two exceptions.

Since it is known from the structure of the data set that, as described above, a time interval of 95 hours is concerned, over which samples were taken and each sample was numbered successively, it can be concluded that clusters 2 and 3 are delimited time regions which, at the same time, can be described by linear relationships which can be distinguished completely with the aid of the method.

Figure 15:
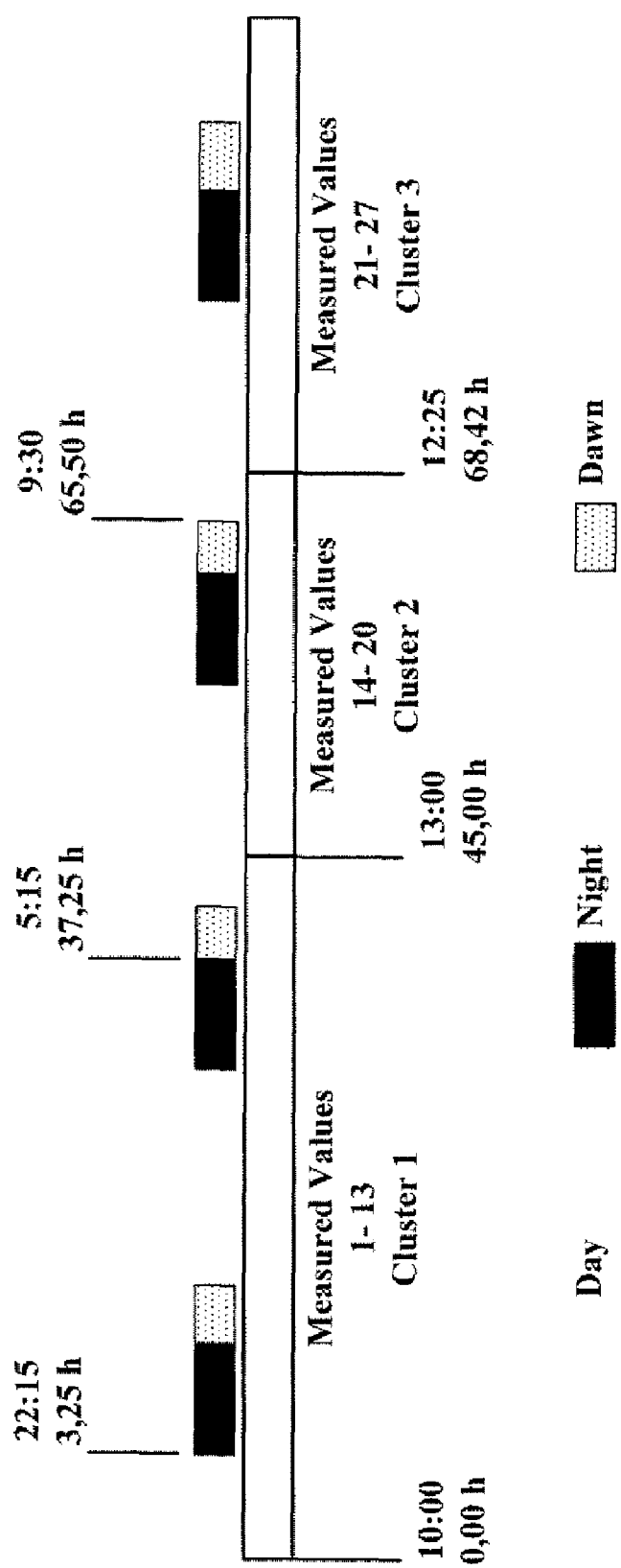
FIG. 15 shows time lines with an upper time line for the change of the times of day and a lower time line for the assignment of time intervals, measured value numbers and clusters according to FIG. 14B.

The significance is to be emphasized once again by using FIG. 15. Two time lines in bar form are illustrated. Both begin with the point 0 h at 16:00. In the upper time interval, the various day times day, night, dawn, are shown; in the lower time line the corresponding clusters 1, 2 and 3 and their corresponding time regions (cf. FIG. 14B) are shown. Since the samples were taken at intervals of 3-5 hours, the result is a somewhat less sharp transition between day and night than that illustrated in FIG. 15. Time values are indicated by way of example for the upper time line as guide values. It becomes clear from the lower time line that the lengths of the last two sections are in each case approximately 24 hours long. The following hypothesis can therefore be formulated: the observed plant shows metabolic changes with a specific time delay in relation to sunrise, which is expressed in a changed ratio of the metabolites 2-methylserine and 2-O-glycerol galactoside (different, distinguishable linear relationships). This time delay can be designated "awakening", so to speak, altering the metabolism from night to day. The plant therefore begins its "daily work" between about 9:00 and 13:00. Secondly, the respective following night appears to show no changes in the ratio of the metabolites. Accordingly, this "daily work" could be persistent. It may be that this points to an accumulative effect.

For the further evaluation, a t-test on all the variables was carried out between the clusters 2 and 3 (cf. FIG. 14B). In the case of 235 variables, a p-value <0.05 resulted in 85 positive results. Of these 85, 26 were explained as wrongly positive, since the positive result resulted from the lack of measured values. This lack of measured values is a particular circumstance which consists in the fact that, for an extremely wide range of reasons, in the case of specific measured values no statements about the true value could be made. One example is the malfunction of automated measuring methods, in which a sample was not measured. The method proposed takes this fact of the lack of information into account, in that the analytical error is representatively chosen to be virtually infinitely large and the missing measured value is therefore disregarded when taking the points into account. Any linear relationships which may be present are therefore not hidden as a result. This is also an advantage of the method described. Following the extraction of all the wrongly positive tests, 59 positive tests therefore remain. With p<0.01, this number decreases to 26.

Figure 16:
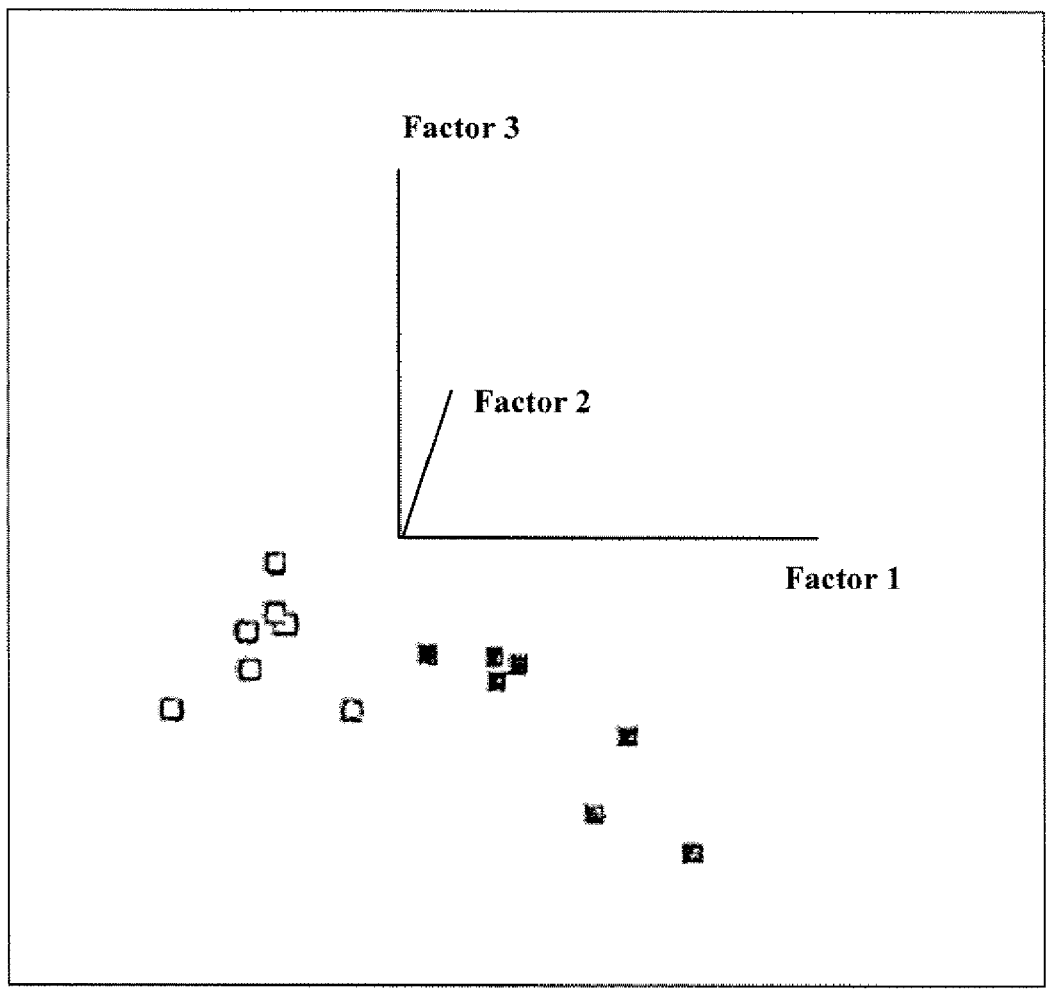
FIG. 16 shows a factor analysis of the clusters 3 (black) and 2 (white) in FIG. 14B of 59 measured variables.

In the further evaluation, all 59 variables, including the measured values corresponding to clusters 2 and 3, are combined to form one data set and are subjected to factor analysis (cf. FIG. 16). As can be seen, the two groups of points form delimited clusters. The "influence" of the measured variables on the factors is designated loading.

Figure 17:
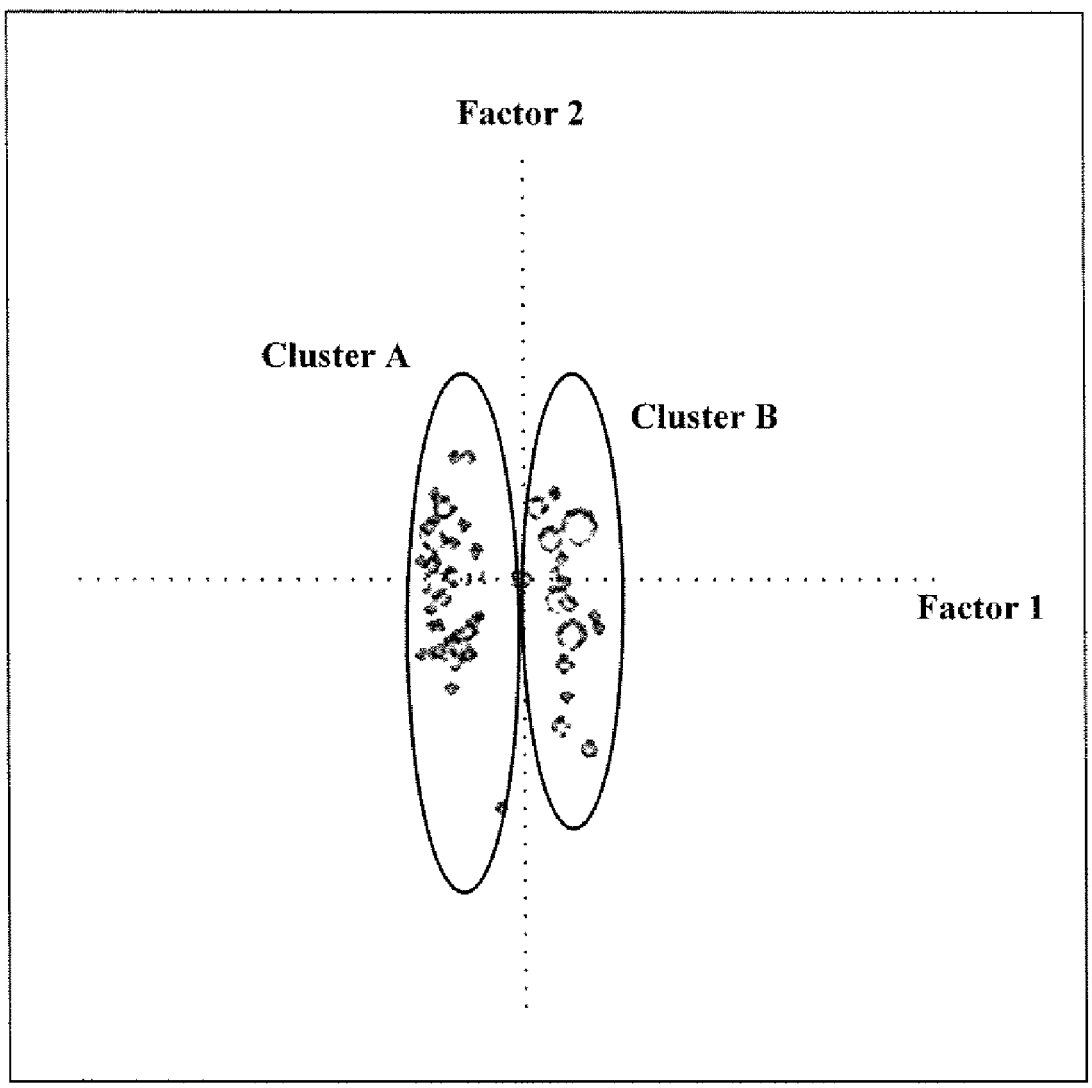
FIG. 17 shows loadings of the measured variables on the factors 1 and 2 from the factor analysis according to FIG. 16.

The influence of the measured variables on the factors 1 and 2 is illustrated in FIG. 17. Different sizes of circles represent the measured variables. The size of the circles is used in this case to estimate the variance of the individual measured variables among one another. As can be seen, two delimited clusters A and B manifest themselves. It is striking that all the measured variables present in the data set relating to the amino acids are contained completely in cluster B. In this case, the division is carried out completely by factor 1. It can therefore be assumed that the clustered measured variables point to functional relationships. The factor analysis illustrated is, as indicated above, a clustering method which is familiar in biology. Because of the delimited nature of the clusters and the results, it can be assumed that the proposed hypothetical clustering is biologically valuable information. The t-test and also factor analysis serve as examples of the above-described further examination of the data set found with statistical methods.

With the aid of the method described, unbiased (hypothetical) linear relationships can be determined as an expression of a functional relationship in sets of measured data. It has been shown that linear relationships can be determined in existing biological measured data. It was also possible to show that unknown relationships can be filtered out. The method uses the analytical error as an input, which means that random variance is taken into account. This leads firstly to it being possible for hypothetical linear relationships always to be connected to a precisely defined set of points. Secondly, it prevents possible hypotheses being ruled out by an excessively high analytical error. This also makes it possible to rule out the uncertainty which resides in unmeasured values for the generation of a hypothesis.

The features of the invention disclosed in the above description, the claims and the drawing can be of importance both on their own and in any desired combination for the implementation of the invention in its various embodiments.

The invention claimed is:

1. A method for determining a linear relationship in a set of measured data that can be stored electronically, the set of measured data comprising a plurality of measured values assigned to a plurality of measured variables, and it being possible for the linear relationship to be represented graphically by means of a straight line, the method comprising:

selecting a set of measured values for at least two measured variables from the set of measured data that can be stored electronically;

assigning a respective measurement uncertainty interval to each of the selected set of measured values;

forming a set of hypothetical linear relationships based at least in part on the selected set of measured values;

determining partial probabilities for the set of hypothetical linear relationships and assigning the determined partial probabilities to the set of hypothetical linear relationships, a partial probability being determined and assigned for one of the set of measured values for one of the set of hypothetical linear relationships if the measurement uncertainty interval of the one of the set of measured values is intersected by the one of the set of hypothetical linear relationships;

determining a total probability for at least a portion of the set of hypothetical linear relationships by summing the partial probabilities associated with the portion of the set of hypothetical linear relationships; and determining a rank of the set of hypothetical linear relationships as a function of the total probabilities determined for the portion of the hypothetical linear relationships.

2. The method as claimed in claim 1, wherein each of the respective measurement uncertainty intervals of the set of selected measured values is assigned to one of the set of hypothetical linear relationships in accordance with BAYES' law.

3. The method as claimed in claim 1, wherein each of the set of selected measured values is incorporated in the determination of the partial probabilities for the set of hypothetical linear relationships and in assigning the determined partial probabilities to the set of hypothetical linear relationships.

4. The method as claimed in claim 1, wherein a value of +/- 2 times the standard deviation in accordance with the Gaussian standard function is assigned as the respective measurement uncertainty interval for each of the set of selected measured values.

5. The method as claimed in claim 1, wherein the set of hypothetical linear relationships are formed on the basis of the Hessian standard form for a straight-line equation.

6. The method as claimed in claim 1, wherein a subset of measured data is formed for a subset of the set of measured values, the subset of measured data comprising data for the portion of the set of measured values for which one or more partial probabilities were summed during the determination of the total probability for at least the portion of the set of hypothetical linear relationships.

7. The method as claimed in claim 6, wherein the subset of measured data is evaluated statistically by means of an evaluation method.

* * * * *